United States Patent Office 3,842,035
Patented Oct. 15, 1974

3,842,035
POWDER COATING COMPOSITION
Cornelis H. J. Klaren, Delft, Netherlands, assignor to Shell Oil Company, New York, N.Y.
No Drawing. Filed Sept. 25, 1972, Ser. No. 292,205
Claims priority, application Great Britain, Oct. 1, 1971, 45,791/71
Int. Cl. C08g 30/14
U.S. Cl. 260—47 EN          9 Claims

ABSTRACT OF THE DISCLOSURE

This invention relates to a heat curable powder coating composition which, upon curing, gives a matt finish and which comprises a mixture of a slow curing, heat curable, thermosetting powder composition and a fast curing, heat curable, thermosetting powder composition. This invention further relates to a process for applying a coherent surface coating which exhibits a matt finish, the process comprising the steps of (I) mixing the slow curing and fast curing thermosetting powder compositions, (II) applying a coating of the mixture to the surface of the article to be coated, and (III) heating the mixture so applied to cure. This invention also includes an article coated by the above process.

BACKGROUND OF THE INVENTION

Field of the Invention

This invention relates to a heat curable powder coating composition which, when cured, gives a matt finish. This invention also relates to a process for applying the composition and an article coated using the process.

Prior Art

With the growing concern over keeping toxic solvent fumes out of the atmosphere and, of course, economic pressures, people involved in the industrial finishing and paint manufacturing businesses are constantly trying to develop cleaner, more efficient products. One area of development which, it has been predicted, will revolutionize the finishing industry is in the use of powder coatings. (See the report of the First North American Conference on Powder Coating held at Toronto, Ontario, Canada, February 25-26, 1971, sponsored by Canadian Paint and Finishing.) The most important advantages powder coatings offer are almost no wastage, no pollution from the use of solvents, and ease of application. However, in spite of these advantages, it has been difficult to obtain the type of finish desired on the coated article. As is true with regular solvent borne paints, there is a demand for a good quality matt finish which can be obtained easily and with predictability. Work done in the past which has resulted in coatings which give somewhat acceptable matt finishes involved adding matting agents of varying types, but generally the degree of mattness was difficult to predict.

For example, it is known that films having matt finish can be made from powder coating compositions in which binder and pigment (or matting agent such as micro-fine silica) have been dry-blended. However, difference in specific gravity of the dry-blended components, and difference in pick-up by the surface to be coated cause unacceptably large variations in mattness. Moreover, the excess powder which is recovered from the coating operation has a composition which is different from that of the starting material, and can therefore not be re-used without expensive and troublesome reformulation.

Another known method for preparing coating powders comprises blending the ingredients (binder, pigments, fillers) at or above the softening temperature of the binder, thereby ensuring complete wetting of pigments and fillers by the molten binder. Powders so prepared give glossy films, which for some purposes are desired, for example, for small articles; on the other hand for some purposes, such as coating large surfaces, often a matt finish is required, to avoid inconvenient light reflection or to improve tranquility of appearance. Matting agents such as micro-fine silicas used in solvent-based coating compositions cannot be used in fusion-blended powder coating compositions, as they are too weak, and are disintegrated mechanically by the shear action on the highly viscous molten mass. The use of ethyl cellulose with thermosetting epoxy resin powder coating improved the process of matt coating, but still involved the addition of a matting agent.

Still another method for preparing powder surface coating which exhibit a matt finish when cured involved preparing a composition comprising an epoxy resin, a curing agent, pigments, other additives, and a matting agent comprising sulphamic acid and trimellitic anhydride.

Surprisingly, it has now been found that a coating which exhibits a matt finish can be attained by using a powder coating composition which is a mixture of two separately prepared heat curable, thermosetting powder coating compositions—one a slow curing composition, the other a fast curing composition. No matting agent need be added.

The binder components of the two compositions are compatible, and when each of the powder compositions is applied separately and cured, it results in a glossy film. It is remarkable that a dry-blended mixture of such separately prepared powder compositions will give a matt finish.

Although the reason for the resulting matt finish is not presently completely understood, it is thought that an incompatibility is developed between two phases in the coating, thus leading to a visual effect of mattness. On applying the powder blend of this invention onto a surface and curing by heat the powders will first melt and flow out to produce a continuous phase (attributed to the slow curing composition) and a dispersed phase (attributed to the fast curing composition which cures so rapidly that diffusion into the continuous phase is blocked).

SUMMARY OF THE INVENTION

The invention is a novel heat curable powder coating composition which, when cured gives a matt finish. Another aspect of the invention is a process for applying a coherent surface coating with a matt finish to an article. Still another aspect of the invention is the article which is coated by this process.

The novel, heat curable powder coating composition of this invention comprises
  (A) A slow curing heat curable, thermosetting, powder composition, and
  (B) A fast curing, heat curable, thermosetting, powder composition.

The process of this invention comprises
  (I) Mixing (A) a slow curing, heat curable, thermosetting, powder composition and (B) a fast curing, heat curable, thermosetting powder composition.
  (II) Applying the mixture of (I) to a surface, and
  (III) Heating the mixture so applied to cure.

The article of this invention is an article coated with a cured composition which exhibits a matt finish, the article being prepared by the above three step process (I, II and III).

PREFERRED EMBODIMENTS
OF THE INVENTION

The Composition

The terms "matt" finish or degree of "mattness" are defined in terms of gloss. Although gloss is a complex phenomenon related to the physical nature of a surface and the manner in which the surface reflects incident light, for purposes of this invention, it will be defined as the "degree to which a painted surface possesses the property of reflecting light in a mirror-like manner" (*Modern Surface Coatings*, Paul Nylen and Edward Sunderland, John Wiley and Sons Ltd., London, 1965, p. 22). Gloss was determined in measurements for this invention according to Lange at 45°/45° angle. It is understood that a "matt" finish includes "matt" films which exhibit about 20–25% gloss, "semi-matt" films which exhibit about 25 to 40% gloss, and "silk-like" films which exhibit from about 40 to 65% gloss.

It is generally accepted in the coating art that powder coatings are those which are essentially solvent free and are put onto a surface as a powder (aggregate of small particles) by any of the means known in the art such as fluidized bed or electrostatic spraying. As pointed out above, the powder coating composition of this invention is heat curable, that is, the application of external heat is required to transform the powder coating composition into a hard, infusible thermoset form. This resultant coating is a layer (also referred to as a film) which is firmly anchored to the surface of the article on which it is applied, i.e., a coherent surface coating. The heat curable powder coating composition is characterized further as comprising two particularly defined thermosetting powder compositions. A thermosetting material in this case, is a material which will undergo a chemical reaction by action of heat, catalysts, etc. leading to a relatively infusible and cross-linked state, commonly referred to as the thermoset form.

The essence of this invention is based upon the surprising observation that a matt finish can be imparted to a thermoset surface coating by using a heat curable powder coating composition which comprises (A) A slow curing, heat curable, thermosetting powder composition, and (B) A fast curing, heat curable, thermosetting powder composition.

The terms "slow curing" and "fast curing" compare and distinguish the two thermosetting powder compositions (A) and (B), composition (A) requiring a longer period of time to cure than composition (B). Composition (B) by definition, then, cures more rapidly than composition (A). For purposes of describing this invention, the curing rate is determined and defined in terms of gel time of the thermosetting powder compositions (A) and (B). The gel time as used herein is the time wherein a 2 gram sample of the powder, put on a hot plate at a fixed temperature above the melting temperature of the powder, preferably at 180° C., and manipulated there with a flat small spatula, will gel as appears from a suddenly increased difficulty in manipulating the molten mass, and from the pulling of threads when the spatula is lifted from the mass on the hot plate. The gel time can be determined with an accuracy within 5%.

Generally, the slow curing powder composition (A) used in this invention will exhibit a gel time of about 6 minutes to about 30 minutes, while the fast curing powder composition (B) will exhibit a gel time of less than 6 minutes but more than 1 minute.

Generally, the ratio of gel times of the powder compositions (A) and (B) is at least 2 when a silk-like appearance is desired and the powders are dry blended in a 1:1 weight ratio, that is, the time it will take composition (A) to gel is at least twice as long as it takes composition (B) to gel. For matt or semi-matt appearance, this ratio of gel times is preferably at least 4, and more preferably at least 7, that is, preferably the gel time of composition (A) is at least 4 times and more preferably at least 7 times, the gel time of composition (B). Said in another way, for silk-like appearance of the thermoset surface coating, composition (B) should cure about twice as fast as (A), while for a matt or semi-matt appearance, (B) should cure at least about 4 times as fast as (A) and preferably at least about 7 times as fast. For example, if at 180° C. the gel time of composition (A) is 500 seconds and the gel time of composition (B) is 250 seconds, the gel time of (A) is twice that of (B) or (B) cures twice as fast as (A). Generally, the ratio of gel times of (A) to (B) will be no more than 20 and preferably no more than about 10.

The difference in gel time between the slow curing composition (A) and fast curing composition (B) is accounted for and regulated by the difference in the amount of accelerator in the two compositions. Composition (A) comprises a heat curable thermosetting resin, a latent curing agent and optionally a curing accelerator, while composition (B) comprises the same type of heat curable thermosetting resin as (A), a latent curing agent, and a curing accelerator. In general, the more curing accelerator in composition (B) the faster it will cure and the greater difference in curing accelerator content in the powders (A) and (B), the greater the difference in gel time and thus the greater the matting action will be, provided that the total amount of curing accelerator in the blend of the powders (I) and (II) is not excessive.

The heat curable thermosetting resins useful in compositions (A) and (B) of this invention include thermosetting acrylic resins, alkyd resins, and preferably epoxy resins. Generally, the curable thermosetting resin is a solid at ambient temperatures and melts about 60° C. Of course, the curing agents and accelerators used will depend upon what is needed to cure the type of thermosetting resin. The same type resin is used in both compositions (A) and (B), i.e., if an acrylic is used in (A), the same will be used in (B), the difference in the compositions being in the amount of curing accelerator used.

A latent curing agent, as used in this invention is a curing agent which does not react with the solid thermosetting resin at ambient temperature, and which is also solid at ambient temperature and melts above 60° C. The type of curing agent used depends upon the type resin which is to be cured.

The curing accelerator increases the speed of the gelling and curing of the thermosetting resin by the curing agent at temperatures above the melting point of the resin, preferably at temperatures between 120° C. and 200° C. The curing accelerator may be solid or liquid at ambient temperature since the amount is usually so small that a liquid curing accelerator does not unfavorably affect the pulverizing characteristics or the melting point of the resulting powder.

Although epoxy resins in general may be used in this invention, e.g., glycidyl ethers of novolac resins, diglycidyl ethers of bisphenol A, glycidyl ethers of other aromatic compounds, glycidyl esters, other glycidyl epoxy resins and mixtures thereof, the preferred epoxy resins for the purpose of the invention are polyglycidyl ethers of 2,2-bis(4-hydroxyphenyl) propane having a Durrans' softening temperature between 60° C. and 140° C. and an epoxide equivalent weight of about 500 to 2500, and preferably having a softening temperature between 80° C. and 110° C. and an epoxide equivalent of about 600 to 1025. Such a polyglycidyl ether having a softening point between 80° C. and 110° C. may be combined with minor amounts, e.g., less than 30% by weight, of similar polyglycidyl ethers having other softening points, for example, between 60° C. and 80° C., or between 110° C. and 160° C., in which case such a combination can be used either in powder (A) or in powder (B), or in both powders (A) and (B). Other imminently useful epoxy resins are those which are the hydrogenation product of the polyglycidyl ethers of 2,2-bis(4-hydroxyphenyl)propane, the product retaining at least 80% of the original oxirane groups and having substantially all of the aromatic portions saturated, while at the same time being substantially free of bound chlorine. These resins are further described in U.S. 3,336,241 to Shokal and U.S. application 256,261, filed May 24, 1972.

When using an epoxy resin as the heat curable thermosetting resin, the latent curing agent is preferably an aliphatic guanidine derivative, such as dicyandiamide or dicyandiamidine or a polycarboxylic acid anhydride such as phthalic anhydride, tetrachlorophthalic anhydride, "chlorendic" anhydride (1,4,5,6,7,7 - hexachloro-bicyclo-[2.2.1]-heptene-2,3-dicarboxylic anhydride), pyromellitic dianhydride, 3,3',4,4'-benzophenone tetracarboxylic dianhydride, trimellitic anhydride and partial esters thereof with ethylene glycol and glycerol; mixtures of two or more polycarboxylic acid anhydrides may also be used. Other curing agents are aromatic amines such as p,p'-bis(aminophenyl)methane, p,p'-bis(aminophenyl)sulphone, and m-phenylene diamine, and adducts of these aromatic amines with liquid mono-epoxides in a 1:1 to 1:1.2 molar ratio. These curing agents and the ratio to epoxy resin in which they are preferably used are known in the art. For good quality of the cured coating it is preferred to use in both powder compositions (A) and (B) a curing agent of similar nature, and to use the same or essentially the same weight ratio of curing agent to epoxy resin in both powder compositions (A) and (B). The curing agent is present in about 1 to 30 parts by weight (p.b.w.) per 100 p.b.w. epoxy resin and preferably is present in about 5 to 20 p.b.w. resin.

Curing accelerators for use in an epoxy resin based powder compositions (A) and (B) may be amino compounds such as benzyl-dimethyl amine, imidazole, 2-methyl imidazole, 2-methyl-4-ethyl imidazole, 2-ethyl-4-methyl imidazole; adducts of imidazoles with mono- or polyepoxides, such as adducts of the imidazoles mentioned above with Cardura® E Resin (glycidyl ester of a mixture of alpha-branched $C_9$-$C_{11}$ saturated aliphatic monocarboxylic acids), or with glycidyl polyethers of polyhydric phenols; amine salts such as 2,4,6-tris(dimethylaminomethyl)phenol octoate, or acetate, lactate or tartrate of imidazole compounds, quaternary ammonium salts such as benzyl trimethyl ammonium chloride; stannous salts such as stannous octoate or stearate; phosphorus compounds such organic phosphines and quaternary phosphonium halides; and alkali metal salts of carboxylic acids such as lithium, sodium or potassium benzoates, naphthenates, or stearates. The alkali salts accelerate specifically the cure of epoxy resins with polycarboxylic acid anhydrides, whereas the other accelerators can be used in combination with the aliphatic guanidine derivatives, preferably in combination with dicyandiamide, as well as with polycarboxylic acid anhydrides and aromatic amines. The total amount of accelerator in the combined powder compositions (A) and (B) is usually small, for example 0.5 to 4 parts by weight per 100 parts by weight of epoxy resin.

For optimum matting effect it is preferred to have in powder composition (A) no curing accelerator, or only a small amount, e.g., less than 25% of the total amount of accelerator used in the final blend of the powder compositions (A) and (B). As gel times depend upon the presence of, or the amount of, accelerator this means in other words that the gel times of the powder compositions (A) and (B) should differ considerably for obtaining the best matt effect. For epoxy resins cured with dicyandiamide the difference in gel time (at 180° C.) of powder compositions (A) and (B) is preferably in the order of 400 seconds or more to obtain mat films, with powders (A) and (B) blended in about 1:1 weight ratio. If the difference in gel time is less than 400 seconds semi-mat films and silk-like films can be made.

Semi-matt and silk-like films can also be made by blending slow curing powder composition (A) and fast curing powder composition (B) in weight ratios other than 1:1. The gloss value, i.e., degree of mattness is most effectively controlled by using the fast curing powder coating composition (B) in excess of the slow curing powder coating composition (A). This is so because it has been found that as the ratio of (B):(A) increases above 1:1 the gloss increases rather gradually, whereas as the ratio of B:A drops below 1:1 the change in gloss is rather severe. (See Embodiment I of this specification for further discussion.) Generally, a range of weight ratios of powder compositions (A) and (B) between 2:1 and 1:5 will provide a gradual range of gloss values from matt through semi-matt to silk-like.

It will be clear that a large variety of matt effects can be obtained by dry blending powder compositions (A) and (B) of various accelerator content in various ratios as outlined above.

The powder compositions (A) and (B) may also contain usual additives, such as pigments, fillers, flow control agents, anti-cratering agents, and the like. The amounts of such additives is preferably the same in compositions (A) and (B); the additives can conveniently be incorporated into the powder compositions (A) and (B) during the fusion blending or mill blending.

The Process

The process of this invention comprises
(I) Mixing (A) a slow curing, heat curable, thermosetting powder composition and (B) a fast curing, heat curable, thermosetting powder composition,
(II) Applying the mixture of (I) to a surface, and
(III) Heating the mixture so applied to cure.

The powder compositions (A) and (B) as described previously can be prepared by fusion-blending or mill-blending according to known methods in the art. However, erratic results are sometimes attained if a pebble-mill is used for preparation of the powder compositions and for this reason fusion blending is preferred.

The slow curing and fast curing powder compositions are prepared separately as known in the art by blending the ingredients in a heated Z-blade mixer, on hot rolls, or in an extruder; extruders offer the advantage of a very short fusion-blending time so that they may be used for making large quantities of formulations which are difficult to compound in a Z-blade mixer. The cooled solid compound is then ground (for example in a pin disk mill) and sieved to obtain a powder of the desired particle size, for example passing 45 mesh ASTM for use in a fluidized bed equipment, between 200 mesh and 45 mesh ASTM for use in an electrostatic fluidized bed, or less than 200 mesh ASTM for electrostatic spraying.

Powder compositions (A) and (B) so prepared are mixed in the desired ratios in suitable dry-blending apparatus known in the art so that there will be a uniform distribution of the two powder compositions throughout the mixture. Since the weight ratios for blending and the specific gravity do not differ by any significant amount, a first blending in any type of dry-blending mixer followed by find blending in a mixing mill, or similar mixing means as known in the art will be sufficient.

Since powder compositions (A) and (B) have practically the same specific gravity, pick-up, and adhesive characteristics, they will not easily separate in different ratios from the blend when applied according to usual techniques, such as fluidized bed coating techniques, powder spray coating techniques such as flame spraying, blow spraying and electrostatic spraying; flock spraying; and curtain coating. Thus, these are known techniques that are very useful for applying the mixture of the fast curing and slow curing powder compositions in step (II) of the process of this invention.

After the mixture of the two powder coating compositions (A) and (B) has been applied to the surface of the article to be coated, heat is applied by conventional means to cure the composition to the infusible, thermoset form. This step is often referred to as "stoving" and is carried out by heating the article to about 120° C. to 200° C. for about 10 minutes to an hour, or until cured. For the preferred epoxy based powder compositions of this invention, the coated article is heated to about 175° C. to 185° C. for about 10 to 20 minutes.

The Article

The article of this invention is coated by the process of
(I) Mixing (A) a slow curing heat curable thermosetting powder composition and (B) a fast curing, heat curable, thermosetting powder composition,
(II) Applying the mixture of (I) to the surface of the article to be coated,
(III) Heating the mixture so applied to cure.

The article to be coated in this case includes any article which can be coated using the conventional powder coating techniques known in the art. Generally, this will include, but is not necessarily limited to, articles with metal surfaces, especially where epoxy based powder compositions are used. The article broadly encompasses appliances, such as housings for washing machines, dryers, stoves, refrigerators; automobile bodies and parts; cans, drums, tanks and pipes; marine structures; architectural articles; and other articles which are generally coated using epoxy powder coatings.

To illustrate the manner in which the invention may be carried out, the following specific embodiments are given. It is to be understood, however, that the embodiments are for the purpose of illustration and that the invention is not to be regarded as limited to any of the specific conditions or reactants recited therein. Unless otherwise indicated, parts and percentages in the embodiments are by weight.

SPECIFIC EMBODIMENTS

Components used in the embodiments are:

Polyether E: a polyglycidyl ether of 2,2-bis(4-hydroxyphenyl)-propane having epoxy equivalent weight 970, and Durrans' softening temperature 98° C.

K-10: a tertiary amino catalyst, melting point 79° C., nitrogen content 10% wt.

EMBODIMENT I

Two powder compositions were separately prepared by fusion blending of the components in a laboratory Buss-Ko-Kneader at 90° C., cooling the blend, grinding and sieving to a particle size of less than 75 microns. The composition of the powders was (in parts by weight):

|  | Powder T17 | Powder X17 |
|---|---|---|
| Polyether E | 61 | 61 |
| TiO$_2$ | 31 | 31 |
| Monital B30H | 2.0 | 2.0 |
| Aerosil 380 | 0.3 | 0.3 |
| Modaflow (flow control agent) | 0.25 | 0.25 |
| Dicyandiamide | 2.7 | 2.7 |
| K10 |  | 0.915 |

Powder T17 is a slow-curing powder, powder X17 is a fast-curing powder.

The powders T17 and X17 were dry blended at ambient temperature in weight ratios varying from 5:1 to 1:5. The blends—and also the powders T17 and X17 themselves—were applied onto degreased cold rolled steel panels by electrostatic spraying and stoved at 180° C. for 15 minutes, unless otherwise noted. Also the gel time of all the powders was determined. The results are given in Table I.

It is clear from Table I, that when the two separately prepared powder compositions are applied individually to degreased steel panels and cured, the gloss is very high (108% from T17 and 100% for X17) but surprisingly enough when the two are mixed in various ratios, less gloss, i.e., higher mattness, is obtained. As discussed under "Preferred Embodiments" in this specification, the mixtures of the slow curing compositions (T17) and the fast curing composition (X17) wherein the T17 is in excess, i.e., ratios of T17:X17 from about 2:1 to 5:1, show a narrow increase in percent gloss—from 18% to 30%. On the other hand where is fast curing composition in excess or in about equal amounts there is a broad range increase in gloss, i.e., from about 25% to 68%. With the faster curing powder composition in excess, of course, the gel and cure time is less, which is an advantage since that allows the articles to be coated more rapidly. For these reasons a weight ratio of the slow curing, heat curable, thermosetting powder coating composition (A) to the fast curing heat curable, thermosetting powder coating composition (B) is in the range from about 2:1 to about 1:5. This gives range of films from matt (20–25% gloss) to silk-like (60–65% gloss).

TABLE I

| Powders | Weight ratio | Gel time at 180° C. (seconds) | Gloss, percent (Lange, 45°/45°) | Erichsen slow penetration (mm.) | Erichsen impact (mm.) |
|---|---|---|---|---|---|
| T17 |  | 560 | *108 | *>8 | *>7 |
| T17/X17 | 5:1 | 425 | 30 | >8 | 5 |
| T17/X17 | 4:1 | 360 | 23 | >8 | 3 |
| T17/X17 | 3:1 | 300 | 20 | >8 | 6 |
| T17/X17 | 2:1 | 215 | 18 | >8 | 2 |
| T17/X17 | 1:1 | 125 | 25 | 7.5 | <1 |
| T17/X17 | 1:2 | 95 | 45 | 4.4 | <1 |
| T17/X17 | 1:3 | 87 | 56 | 4 | <1 |
| T17/X17 | 1:4 | 75 | 67 | >8 | 2 |
| T17/X17 | 1:5 | 70 | 68 | >8 | 2 |
| X17 |  | 65 | **100 | **>8 | **1 |

* Cure schedule=30 minutes at 180° C.
** Cure schedule=7 minutes at 180° C.

Embodiment 2

In Embodiment 1 the relation was shown that exists between the gel times of a fast-curing and a slow-curing powder and the gloss (when cured) of a dry-blended mixture of the two. The overall properties of the cured coatings were quite acceptable, although the Erichsen impact was low in the area of the ratios 1:1 to 1:3, an area where change of mattness with composition is rather gradual, and therefore technically attractive. This embodiment will show how increased impact values can be obtained (at low matt values) by incorporating small amounts of catalyst in the slow-curing powder component.

Two powders, U17 and W17, were prepared as described for T17 in Embodiment 1, each having the same composition as T17, but containing additionally:

U17: +0.15 part by weight K10
W17: +0.61 part by weight K10.

Two dry-blended powders were then made:

U17/X17 in 1:1 weight ratio, and
U17/W17 in 1:1 weight ratio.

U17 contains a small amount of catalyst, and is a slow-curing powder (long gel time), W17 is a fast-curing powder (short gel time).

The blends were evaluated as in Embodiment 1, with the following results (values for U17 and W17 separately are given for comparison). It can be seen that U17 and W17 alone, as with T17 and X17 alone, show very high gloss film, while mixtures give semi-matt or silk-like films.

TABLE II

| Powders | Weight ratio | Gel time at 180° C. (seconds) | Gloss, percent (Lange 45°/45°) | Erichsen slow penetration (mm.) | Erichsen impact (mm.) |
|---|---|---|---|---|---|
| U17 |  | 483 | 100 | >8 | 7 |
| U17/W17 | 1:1 | 182 | 54 | >8 | 6 |
| W17 |  | 92 | 98 | *>8 | *5 |
| U17/X17 | 1:1 | 105 | 45 | >8 | 3 |

*Cure schedule: 10 minutes at 180° C.

Embodiment 3

Two powders were prepared by fusion blending of the components in a laboratory Buss-Ko-Kneader at 85° C., cooling the blend, grinding and sieving to a particle size of less than 75 microns. The composition of the powders was (in parts by weight).

|  | Powder A | Powder C |
|---|---|---|
| Polyether E | 118.6 | 118.6 |
| TiO$^2$ | 20 | 20 |
| Trimellitic anhydride | 21.2 | 21.2 |
| Lithium benzoate (catalyst) | 0.1 | 2.5 |
| Modaflow | 8.6 | 8.6 |

The gel times at 180° C. were 94, and 46 seconds, respectively.

The powders A and C were dry blended in a 1:1 weight ratio (powder A/C). The blend—and also the powders A and C—were electrostatically sprayed onto degreased cold rolled steel panels and stoved at 180° C. for 15 minutes. The gloss values were:

Powder: Gloss percent; Lange 45/45
- A —————————————————— 100
- A/C ———————————————— 53
- C —————————————————— 100

I claim as my invention:

1. A heat curable powder coating composition which cures to a matt finish comprising (A) one part by weight of a powder composition comprising a polyepoxide having more thane one oxirane group and a latent epoxy curing agent, said composition having a gel time of from 6 to 30 minutes and (B) from 0.5 to 5 parts by weight of a powder composition comprising a polyepoxide having more than one oxirane group, a latent epoxy curing agent, and a curing accelerator, the ratio of the gel time of (A) to (B) being no more than 20.

2. The composition as in claim 1 wherein the gel time of (A) is at least four times the gel time of (B).

3. The composition as in claim 1 wherein the gel time of (A) is at least seven times the gel time of (B).

4. The composition as in claim 1 wherein the polyepoxide is a polyglycidyl ether of 2,2-bis(4-hydroxyphenyl) propane having a Durrans' softening temperature between about 60° C. and 140° C. and an epoxy equivalent weight between about 500 and 2500.

5. The composition as in claim 1 wherein the latent curing agent is an aliphatic guanidine compound.

6. The composition as in claim 1 wherein the latent curing agent is a polycarboxylic acid anhydride.

7. The composition as in claim 5 wherein the curing accelerator is an amino compound.

8. The composition as in claim 6 wherein the curing accelerator is an alkali salt of a carboxylic acid.

9. The composition as in claim 1 wherein the latent curing agent is dicyandiamide and the difference in gel time at 180° C. of said powder compositions (A) and (B) is in the order of 400 seconds.

References Cited
UNITED STATES PATENTS

| | | | |
|---|---|---|---|
| 3,477,971 | 11/1969 | Allen et al. | 260—830 X |
| 3,484,398 | 12/1969 | Childs | 260—47 X |
| 3,555,111 | 1/1971 | Benham | 260—830 |
| 3,647,726 | 3/1972 | Ulmer | 260—47 X |

MELVIN GOLDSTEIN, Primary Examiner

T. E. PERTILLA, Assistant Examiner

U.S. Cl. X.R.

117—132 BE; 260—2 Ep, 2 N, 2 EC, 2 EA, 37 Ep, 47 Ep, 47 EC, 47 EA, 59, 75 T, 78.4 Ep, 89.55, 830 TW, 860, 901